April 22, 1969 D. E. BULL 3,440,438
SEMICONDUCTOR CONTROLLED RECTIFIER CURRENT CONTROL
Filed Nov. 17, 1965
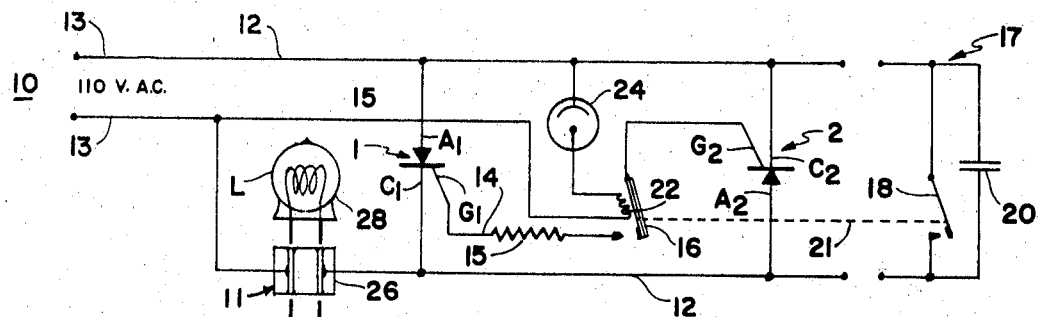
FIG. 1. FIG. 1a.
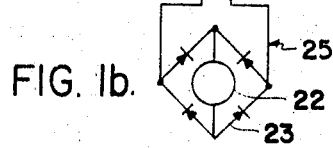
FIG. 1b.
FIG. 3.
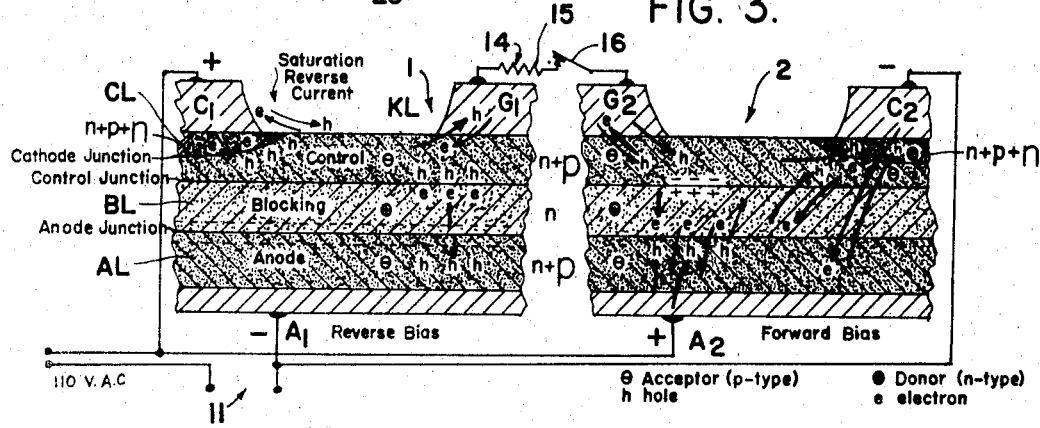
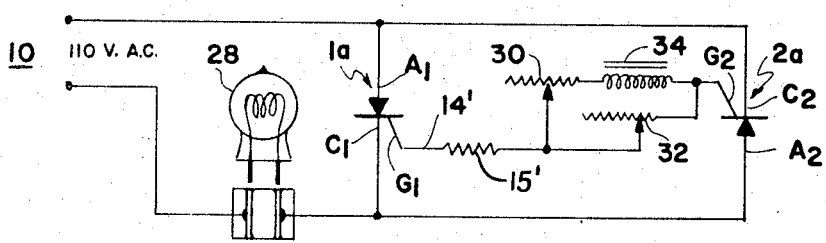
FIG. 2.
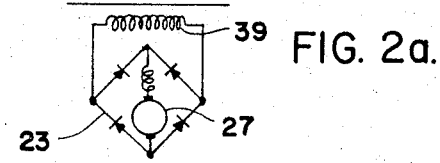
FIG. 2a.
INVENTOR.
DONALD E. BULL
BY
ATT'Y United States Patent Office 3,440,438
Patented Apr. 22, 1969

3,440,438
SEMICONDUCTOR CONTROLLED RECTIFIER
CURRENT CONTROL
Donald E. Bull, Northlake, Ill., assignor to Webcor, Inc.,
Chicago, Ill., a corporation of Illinois
Filed Nov. 17, 1965, Ser. No. 508,309
Int. Cl. H01h 19/64, 31/10
U.S. Cl. 307—113                                          4 Claims

ABSTRACT OF THE DISCLOSURE

A forward connected semiconductor controlled rectifier has its cathode junction forward biased by the saturation reverse current of a reverse biased semiconductor controlled rectifier across a source of alternating potential in circuit parallel with a mechanical switch employed, when desired, to close last in the circuit for a large current and the circuit is opened by the semiconductor controlled rectifiers before the mechanical switch is opened.

---

The present invention relates to improved current control circuits utilizing semiconductor controlled rectifiers and more particularly to SCR current controllers having optimized gating circuits.

Semiconductors controlled rectifier controllers for regulating the application of A.C. power are well known. Present circuits for controlling the firing of SCR's are expensive because other solid state devices are required to render useful signals for application to a gate electrode. The popularity of SCR controllers has given rise to the need for an inexpensive gate control signal generator or source having minimum components and still capable of attaining a minimum stable performance and trouble free service in remote or inaccessible places for long periods of time with a minimum power loss.

In the present invention only a fractional wattage resistor is required to trigger the conduction of heavy alternating power currents through a pair of back-to-back connected semiconductor controlled rectifiers with a power loss as small as 1% of the total power supplied to the controlled device.

The invention is also characterized by the self firing and self phasing of back-to-back connected semiconductor controlled rectifiers as when, for example, only two connections need be made to a unitized component arrangement and these only being to the anode and cathode terminals of the component, thereby lending itself to "plug-in" installations.

Another object of the invention is to provide a stable power current control accessory which is functionally independent of reactive currents caused by inductive loads.

The invention is also characterized by the saturation reverse current of the cathode junction for a reverse biased semiconductor controlled rectifier being used to forward bias the cathode junction of a forward biased semiconductor controlled rectifier connected in back-to-back relationship with the first rectifier across a source of alternating potential.

A further object of the invention is to provide a rugged, inexpensive current switching arrangement wherein large currents are carried for long periods of time through mechanical switch elements with no significant arcing, pitting or mechanical instability of the contacts, and switching is accomplished by solid state elements with virtually no heating of the elements.

An object of the invention is to provide a power current switching device of solid state significance which is less expensive than even purely mechanical conventional switching devices for alternating currents at wattages above 1,000 watts, and which further includes momentary rated surge capacities and switch longevity factors superior to approved electrically controlled mechanical switching arrangements for like wattages.

A general object of the present invention is to provide an improved control circuit by firing the gate of one controlled rectifier with the saturation reverse current of an oppositely biased second controlled rectifier, and further by controlling the reverse current with respect to amplitude and phasing with a surge circuit controlling both controlled rectifiers.

Other and further advantages, objects, characteristics and results will become apparent including the simplicity, low cost, easy assembly and small size of the component provided by unitizing the circuit and arrangement embodying the invention which will now be described in connection with the accompanying drawings in which:

FIG. 1 is a schematic diagram of a switching circuit embodying the invention in which several novel relationships are shown compositely for purposes of explanation;

FIG. 1a associated with FIG. 1 illustrates a modification of the embodiment shown in FIG. 1;

FIG. 1b illustrates diagrammatically a plug-in accessory for the embodiments shown in FIGS. 1 and 1a;

FIG. 2 is a schematic diagram of another circuit embodying the invention by which a variable current output is accomplished for light dimming, motor speed control and variable electric heating applications;

FIGS. 2a and 1b are schematic diagrams of plug-in accessories for the variable current embodiment shown in FIG. 2; and FIG. 3 is a diagram including a sectional showing of the arrangement of the respective zones and junctions of the two semiconductor controlled rectifiers in a basic circuit involving the invention.

By way of explanation and in connection with FIG. 3, semiconductor controlled rectifiers contain one wafer within which there are three p-n junctions obtained by selective diffusion of $p$ (acceptor) and $n$ (donor) type impurities into predetermined portions of a single crystal of silicon to provide four contiguous layers of fixed alternating $p$ and $n$ zones. An intermediate layer comprises the pure base material with a homogenous distribution of only one impurity therein. The bordering layers comprise a higher concentration of the impurity diffused therein from the opposite faces of the wafer to form opposing primary junctions which together render the device essentially non-conductive in either direction.

The third junction is a secondary one derived by diffusing an extremely heavy concentration of one impurity into a portion of one of the previously diffused layers to provide a cathode-gate junction leaving the rest of the layer to serve as an anode connection.

The specific details of SCR construction and its theory of operation having been well developed in the prior art, attention is now focused on the phenomenon of interest in this invention. When a SCR has applied to its an external potential which reversely biases and makes the n-type layer predominantly positive and the p-type layer negative, the electrons and holes are attracted or driven away from the junction. This separation deactivates the majority carries leaving only the minority carriers that are normally present at equilibrium conditions. Only the minority carriers are available for flow in the direction urged by the reverse bias. However, the minority carriers are limited in number and are not augmented by injection of holes or electrons. Thus, the limited reverse current flow remains substantially unchanged with changes and variations in the applied reverse voltage.

Referring more specifically to characteristic four-layer semiconductor controlled rectifiers 1 and 2 (FIG. 3), each has a p-type anode $A_1$ and $A_2$ respectively and a p-type gate $G_1$ and $G_2$ respectively a silicon crystal is initially impregnated with n-type impurities throughout to provide a blocking layer BL and p-type concentrations are added by diffusion on opposite sides thereof to provide an anode layer AL and a control layer KL. Another n-type impurity of high concentration is made upon the control layer of the p-type concentrations. The latter serves as a cathode layer CL. Thus, there are relatively high concentrations of both n and p-type impurities at the cathode-gate junction as noted on the drawing with the capital letter indicating the predominance of impurities.

It has been found that when the cathode-gate junction is reverse biased by application of a current having a positive polarity to the cathode $C_1$ a saturation reverse current of electrons will flow by minority carriers from the gate $G_1$ to the cathode $C_1$ which is substantially constant and which causes a low interelectrode voltage.

Furthermore, it has been found that p and n junctions when subjected to a large reverse potential become so depleted of current carriers in the region of the junction that the junction region becomes polarized under the electric field and acts essentially as a capacitor whose dielectric constant is equal to that of minority impurity layer and whose plate spacing is equivalent to the thickness of the depletion field. This capitance is evident between the negative anode $A_1$ and the positive cathode $C_1$ with the gate $G_1$ sandwiched therebetween and in close proximity to the positive polarity whereby the capitance resulting is predominantly favorable to saturation reverse current electrons flowing to the cathode $C_1$.

Electrons flowing from the gate $G_1$ to some other element in a current conductive relationship imposes a positive polarity effect upon the gate. Thus, while the main current path through the controlled rectifier between the anode $A_1$ and the cathode $C_1$ is substantially blocked by the reverse bias existent at the anode junction $A_1$ with the blocking layer B having only donor impurities, the presence of concentrations of both donor and acceptor impurities at the cathode junction between the gate $G_1$ and the cathode $C_1$ provides a significant saturation reverse current which can be used for generating a positive gating pulse for another SCR.

It has been found that with two silicon controlled rectifiers connected back-to-back and alternately and oppositely forward biased and reverse biased by the cycles of the applied alternating current that is being controlled, the saturation reverse current potential of the reverse biased cathode junction and the capacitance of the anode junction can be used by direct connection to the gate of the other SCR to trigger the forward biased rectifier, and vice-versa, as the half cycles of the applied power current alternate.

It has been found however that, instead of direct connection, it is better to limit the applied gate saturation reverse current by a resistance in the connection between the two gates which protects the SCR's against damage; and reduces the generation of heat in the rectifiers arising from the development and use of the saturated reverse currents.

Because, the conductivity of the back-to-back SCR's can be controlled at will by breaking and making their inter-gate connection, the back-to-back SCR controller circuit is suitable for many uses as a power switch by the utilization of the self-generated exceedingly low current in combination with suitable control means. Suggested control means for switching the inter-gate circuit include reed switches, photo-electric devices, and phase shift devices such as a choke coil or oscillating network which limits conduction to certain portions of each alternating current cycle. Thus, with the use of very low voltage and very low current responsive devices the power input of the load can be varied temporally and potentially.

Referring now to FIG. 1, the two semiconductor controlled rectifiers 1 and 2 are shown in symbols connected back-to-back in oppositely oriented parallel relationship. They are disposed in series with output terminals 11 for a load L which is connected across the conductors 12 which in turn are connected to conductors 13 of an alternating current supply at 10. The anodes $A_1$ and $A_2$ are connected to opposite sides of the conductors 12 so that one controlled rectifier is reverse biased at its cathode and anode while the cathode and anode of the other rectifier is forward biased. This alternates with each half cycle of the alternating current cycle. For the purposes and results above described, the saturation reverse current, which is derived from the gate of the reversely biased rectifier, is applied through an inter-gate control circuit 14 to the gate of the forward biased rectifiers.

The flow of the reverse current in the control means 14 is isolated from the power currents that are controlled by the rectifiers in that the current source connections are confined to only the gates $G_1$ and $G_2$. Other current connections can be made but essentially novelty and novel results in the present invention exist in being able to control massive power currents with the self-induced saturation reverse current of the gates utilized by small, compact, inexpensive electrical elements which need handle only milliampere currents and flea power voltage.

The control circuit 14 includes an impedance of low ohmage, such as a resistor 15 of approximately 60 to 1,000 ohms, the higher the resistance the cooler the gate operation. Furthermore for purposes of particular utility of this embodiment as a power switch the control circuit 14 includes a current flow control or modifying device represented by a switch 16 whereby conduction by the rectifiers is controlled by closing and opening the switch.

Referring to FIG. 1a, visually associated with FIG. 1 as connectable in parallel with the rectifiers 1 and 2, is a circuit 17 which includes a switch 18 bridged by a suppressor capacitor 20. Although it is pointed out again with emphasis that rectifiers (FIG. 1) can be provided that can handle heavy currents directly for any loads, the arrangement depicted by FIG. 1a contemplates great economies in the cost and upkeep of the important solid state components. The switches 16 and 18 are operated sequentially with a closing and opening differential of less than one second and preferably with a differential as short as possible in the micro-seconds with assurance that switch 18 will close last and open first with respect to switch 16. This is particularly assured by the armatures of the two switches being linked and actuated together as indicated by broken lines 21 wherein the contacts of switch 18 are offset enough in the double-pole single-throw action that switch 18 is the last to make and first to break. Thus, with this embodiment the flow of current is made and broken through the rectifiers 1 and 2 while the mechanical switch 18 essentially carries the heavy current only throughout the time that it is "on." As a result, many economies are available.

For example, assuming a 10 ampere current load, the control inter-gate switch 16 need be built only to make and break a microampere at low potentials. With rectifiers rated for a surge of ten times the running amperage, the rectifiers need only be inexpensive ones rated to carry one or two amperes. With a voltage drop across the rectifiers of only one volt the power switch 18 need be built to carry only 10 amperes with a contact life based on only a one volt differential.

Such a switch device is more enduring for remote locations than conventional large potential switches. It can be given a higher surge rating, here at least 20 amperes for one second, because if the switch 18 at higher amperages causes a voltage drop across it exceeding the gate potential requirement the rectifier will be rendered conductive thereby sharing the amperage and permitting longer delayed fuses to be used, provided of course that the expected surges are going to be of less duration than one second. Also, since the mechanical switch contacts 18 make and break at very low potentials, they can be economically provided with otherwise expensive weatherproof contact metals which have a long life because very little quantity of the metal is needed.

In the embodiment shown in FIG. 1 which is particularly useful for controlling the energization of gaseous discharge street illuminating lamps, the switches 16 and 18 can be controlled by a photo cell 24 exposed to the sky. The armature of the switches 16 and 18 is a small bi-metal element subjected to energy from a heater 22. The heater 22 is chosen to have a resistance which increases as darkness approaches and thereby reduces the current and heat to permit the bi-metal armature to close the switches, which under daylight and higher heat conditions had been held in their open position.

Referring to FIG. 1b a plug-in arrangement 25 is shown whereby direct current devices indicated at "load" 22 may be plugged into output terminals 26 and controlled by the switching device described.

Referring to FIG. 2 the basic back-to-back rectifier circuit is shown whereby a light 28 can be variably dimmed, or the speed of a universal motor 27 can be varied.

In this embodiment the inter-gate control circuit 14′ includes a resistor 15′, two fractional wattage rheostats 30 and 32 and a phase shift choke 34.

At the output terminal socket 26 either the light 28 can be plugged in or the leads of a primary coil of a transformer 38 whose voltage reducing secondary 39 has leads connected to a four diode bridge 23 connected to a variable speed motor 27.

The rheostat 30 is a trimmer resistance which is set for the minimal power output desired when the rheostat 32 is set for the lowest output current. This limits the maximum phase shift of the inter-gate control circuit. Thus, intentionally, only a portion of the power cycles is conducted by the forward biased rectifier thereby shortening the resulting output power pulses and reducing the current and voltage accordingly. However, as the rheostat 32 is adjusted to the high output current position, the effect of the phase shift choke 34 is gradually diminished until the saturation reverse current pulses substantially coincide with the conducted cycles to provide 99% power transmission. This provides the variable speed and light control properties of the controller with very inexpenisve, low power components.

By way of example, but not by way of limitation, the components in FIG. 1 are successful in handling a 10 amperes gaseous discharge street lighting lamp load when General Electric C20B SCR's are used. The C20B SCR, currently costing less than $1.00, has a maximum current carrying capacity of 7.4 amperes R.M.S. Resistor 14 is a 1 K. ohm-¼ watt resistor. Capacitor 20 is a .22 mfd. —200 v. D.C. unit.

IN FIG. 2

| S.C.R. | G.E. | C10B |
|---|---|---|
| Resistance | 14 | 1 K. ohms, ¼ watt. |
| Rheostat | 32 | 500 K., ¼ watt. |
| Rheostat | 30 | 500 K., ¼ watt. |
| Choke | 34 | 10 millihenries. |

Having thus described a preferred embodiment of the invention and its novel theory of operation along with modifications, it will be readily seen by those skilled in the art how the stated objects and results are attained and how various modifications and changes can be incorporated without departing from the spirit of the invention, the scopy of which is commensurate with the appended claims.

What is claimed is:

1. An electric switch having a pair of current supply conductors connectible to a source of alternating potential in series with a load,
   a current flow control device comprising a pair of back-to-back connected semiconductor controlled rectifiers each having an anode and cathode connected between said conductors and including means for connecting said rectifiers to a pair of output terminals, the cathode and anode of one rectifier being forward biased with one of the alternating potentials while the cathode and anode of the other rectifier are reverse biased by the same potential,
   a control electrode for each rectifier forming with the cathode a junction in each rectifier directly connecting said control electrodes and including a first switch means,
   means for conducting the signal potential generated by the saturation reverse current at the control electrode of the reverse biased rectifier from the control electrode thereof to the control electrode of the forward biased rectifier to render the forward biased rectifier conductive, and
   second switch means connected in parallel with said current control device controlled by the first switch means for sequential operation closing after and opening before the first switch means.

2. An electric switch having a pair of current supply conductors connectible to a source of alternating potential,
   a current flow control device comprising a pair of back-to-back connected semiconductor controlled rectifiers each having an anode and cathode connected between said conductors and including means for connecting said rectifiers to a pair of output terminals, the cathode and anode of one rectifier being forward biased with one of the alternating potentials while the cathode and anode of the other rectifier are reverse biased by the same potential,
   a control electrode for each rectifier forming with the cathode a junction in each rectifier,
   means for conducting the signal potential generated by the saturation reverse current at the control electrode of the reverse biased rectifier from the control electrode thereof to the control electrode of the forward biased rectifier to render the forward biased rectifier conductive,
   said signal means includes a switch responsive to a force extraneous to said semiconductor controlled rectifiers, and including
   a mechanical switch shunting said semiconductor controlled rectifiers for carrying said source current to said output terminals, and
   means interacting between said switches for closing the latter mentioned switch after the first mentioned switch closes and opening said latter mentioned switch before said first mentioned switch opens in response to the state of said extraneous force.

3. A SCR controller circuit to be placed in series between a source of A.C. electric energy and a load requiring a large rated current of said electric energy for long periods of time comprising:
   (a) a pair of SCR's rated to carry less than said large current, poled in opposite directions, for connection in series with the source and the load,
   (b) a control circuit for transmitting firing signals to the gate electrodes of the SCR's comprising a switch for transmitting a low signal potential of the saturation reverse current appearing at the gate electrodes of the back- biased SCR to the gate electrode of the forward-biased SCR,
   (c) mechanical switch means connected in parallel with the SCR's and rated to carry the amperage of said large current at a rated voltage that is a fraction of the voltage of said larger current, and
   (d) means for sequentially opening said mechanical switch means ahead of the opening of the first mentioned switch.

4. A SCR controller circuit to be placed in series between a source of A.C. electric energy and a load comprising:
   (a) a pair of SCR's poled in opposite directions, for connection in series with the source and the load, (b) a control circuit for transmitting firing signals to the gate electrodes of the SCR's consisting of switch means for transmitting the signal potential generated by the saturation reverse current appearing at the gate electrode of the back-biased SCR to the gate electrode of the forward-biased SCR, said controller circuit comprising in addition a second switch connected in parallel with the SCR's, and means for causing the second switch to close shortly after the first switch has closed and to open shortly before the first switch opens.

References Cited

UNITED STATES PATENTS

| | | |
|---|---|---|
| 2,967,981 | 1/1961 | Wise. |
| 3,210,571 | 10/1965 | Hutson. |
| 3,222,583 | 12/1965 | Gutzwiller _____ 318—345 X |
| 3,223,911 | 12/1965 | Seiler et al. _____ 318—345 X |
| 3,280,386 | 10/1966 | Philips _____ 317—235/41.1 |
| 3,307,042 | 2/1967 | Fogleman _____ 307—88.5/1.27 |
| 3,309,537 | 3/1967 | Archer _____ 317—235/41.1 |
| 3,358,199 | 12/1967 | Jones _____ 318—345 X |

ROBERT K. SCHAEFER, *Primary Examiner.*

T. B. JOIKE, *Assistant Examiner.*

U.S. Cl. X.R.

315—205; 323—24, 36; 318—345